US010554710B2

(12) United States Patent
Cho et al.

(10) Patent No.: US 10,554,710 B2
(45) Date of Patent: *Feb. 4, 2020

(54) METHOD AND DEVICE FOR SWITCHING MEDIA RENDERERS DURING STREAMING PLAYBACK OF CONTENT

(71) Applicant: SAMSUNG ELECTRONICS CO., LTD., Suwon-si (KR)

(72) Inventors: Joon-ho Cho, Suwon-si (KR); Hyun-sik Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 568 days.

This patent is subject to a terminal disclaimer.

(21) Appl. No.: 14/679,477

(22) Filed: Apr. 6, 2015

(65) Prior Publication Data
US 2015/0215360 A1 Jul. 30, 2015

Related U.S. Application Data

(63) Continuation of application No. 13/430,064, filed on Mar. 26, 2012, now Pat. No. 9,009,266, which is a (Continued)

(30) Foreign Application Priority Data

Dec. 10, 2005 (KR) .................. 10-2005-0121237

(51) Int. Cl.
*G06F 15/16* (2006.01)
*H04L 29/06* (2006.01)
(Continued)

(52) U.S. Cl.
CPC .............. *H04L 65/60* (2013.01); *H04L 67/02* (2013.01); *H04L 67/32* (2013.01); *H04N 7/163* (2013.01);
(Continued)

(58) Field of Classification Search
None
See application file for complete search history.

(56) References Cited

U.S. PATENT DOCUMENTS 6,078,942 A 6/2000 Eisler et al.
6,941,378 B2 9/2005 Apostolopoulos et al.
(Continued)

FOREIGN PATENT DOCUMENTS

EP 0319202 A2 6/1989
EP 0418567 A1 3/1991
(Continued)

OTHER PUBLICATIONS

Communication dated May 6, 2015 issued by the European Patent Office in counterpart Application No. EP 15150174.9.
(Continued)

*Primary Examiner* — Mohamed Ibrahim
(74) *Attorney, Agent, or Firm* — Sughrue Mion, PLLC

(57) ABSTRACT

A method and a device for switching a media renderer to another media renderer while a client performs streaming playback of content of a server are provided. Accordingly, a first client that performs streaming playback of the content transmits playback environment information and a URL of the content to the second client, and the second client transmits the received information and information about features of the second client to the server and requests the corresponding content which has the optimized format for the second client from the server. Therefore, a user can continue to watch the media content through a new media renderer in existing playback environment setting without additional manipulation.

21 Claims, 9 Drawing Sheets

Related U.S. Application Data continuation of application No. 11/606,147, filed on Nov. 30, 2006, now Pat. No. 9,055,194.

(51) Int. Cl.

| | | |
|---|---|---|
| *H04N 7/173* | (2011.01) | |
| *H04N 21/258* | (2011.01) | |
| *H04N 21/414* | (2011.01) | |
| *H04N 21/4402* | (2011.01) | |
| *H04N 21/472* | (2011.01) | |
| *H04N 21/658* | (2011.01) | |
| *H04N 21/845* | (2011.01) | |
| *H04N 21/858* | (2011.01) | |
| *H04N 7/16* | (2011.01) | |
| *H04L 29/08* | (2006.01) | |

(52) U.S. Cl.
CPC ... *H04N 7/17318* (2013.01); *H04N 21/25808* (2013.01); *H04N 21/41407* (2013.01); *H04N 21/440263* (2013.01); *H04N 21/47202* (2013.01); *H04N 21/6581* (2013.01); *H04N 21/8455* (2013.01); *H04N 21/8586* (2013.01)

(56) References Cited

U.S. PATENT DOCUMENTS

| | | | |
|---|---|---|---|
| 7,103,906 B1 | 9/2006 | Katz et al. | |
| 7,644,172 B2 * | 1/2010 | Stewart | H04L 29/06 709/227 |
| 2002/0143972 A1 | 10/2002 | Christopoulos et al. | |
| 2002/0174269 A1 * | 11/2002 | Spurgat | H04H 60/88 710/1 |
| 2003/0063528 A1 * | 4/2003 | Ogikubo | G11B 15/1816 369/30.24 |
| 2003/0236895 A1 | 12/2003 | Ohkubo et al. | |
| 2004/0205191 A1 | 10/2004 | Smith et al. | |
| 2004/0243694 A1 | 12/2004 | Weast | |
| 2004/0267965 A1 | 12/2004 | Vasudevan et al. | |
| 2005/0010963 A1 | 1/2005 | Zeng et al. | |
| 2005/0097618 A1 | 5/2005 | Arling et al. | |
| 2005/0262217 A1 * | 11/2005 | Nonaka | H04N 7/17318 709/217 |
| 2006/0001737 A1 | 1/2006 | Dawson et al. | |
| 2006/0002681 A1 * | 1/2006 | Spilo | H04N 5/76 386/220 |
| 2006/0052113 A1 | 3/2006 | Ophir et al. | |
| 2006/0242664 A1 | 10/2006 | Kikkawa et al. | |
| 2007/0089145 A1 | 4/2007 | Medford et al. | |
| 2007/0094691 A1 | 4/2007 | Gazdzinski | |
| 2009/0320073 A1 | 12/2009 | Reisman | |
| 2010/0186034 A1 * | 7/2010 | Walker | H04N 21/4334 725/40 |
| 2013/0117354 A1 * | 5/2013 | Lesser | H04L 67/42 709/203 |

FOREIGN PATENT DOCUMENTS

| | | |
|---|---|---|
| JP | 2004-13283 A | 1/2004 |
| JP | 2004178353 A | 6/2004 |
| JP | 200539657 A | 2/2005 |
| JP | 2005151450 A | 6/2005 |
| JP | 2005-268834 A | 9/2005 |
| KR | 10-2002-0025686 A | 4/2002 |
| KR | 1020050044379 A | 5/2005 |
| KR | 1020050056076 A | 6/2005 |
| KR | 20020043624 A | 7/2005 |
| WO | 2002015630 A1 | 2/2002 |
| WO | 03/032173 A1 | 4/2003 |
| WO | 03040893 A2 | 5/2003 |
| WO | 03/107597 A1 | 12/2003 |
| WO | 2005/029770 A | 3/2005 |
| WO | 2005/062615 A1 | 7/2005 |
| WO | 2005109829 A1 | 11/2005 |

OTHER PUBLICATIONS

Communication dated Apr. 10, 2012 issued by the Japanese Patent Office in counterpart Japanese Patent Application No. 2006-332273.
Communication dated Jul. 26, 2007 issued by the Korean Intellectual property Office in counterpart Korean Patent Application No. 10-2005-0121237.
Ritchie, et al. "UPnP AV Architecture: 1-Document Version 1.1", Sep. 30, 2008, pp. 1-30.
Communication dated Oct. 1, 2013 issued by the Japanese Patent Office in counterpart Japanese Patent Application No. 2012-178360.
Ritchie, et al., "UPnP AV Architecture:1" for UPnP™ Version 1.0, Status: Approved Design Document, Document Version 1.00, Jun. 25, 2002, 22 pgs total.
Communication dated Mar. 26, 2014 issued by the European Patent Office in counterpart European Application No. 06125757.2.
Communication dated Jul. 11, 2019, from the European Patent Office in counterpart European Application No. 15150174.9.

* cited by examiner

METHOD AND DEVICE FOR SWITCHING MEDIA RENDERERS DURING STREAMING PLAYBACK OF CONTENT

CROSS-REFERENCE TO RELATED PATENT APPLICATION

This application is a Continuation of U.S. application Ser. No. 13/430,064, filed on Mar. 26, 2012, which is a Continuation of U.S. application Ser. No. 11/606,147, filed on Nov. 30, 2006, which claims priority from Korean Patent Application No. 10-2005-0121237, filed on Dec. 10, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to a streaming server and a streaming client, and more particularly, to a method and device for switching a media renderer to another media renderer while a client performs streaming playback of the content of a server.

2. Description of the Related Art

As ubiquitous environments have become more widespread, watching media or content at any place has become more desirable. Correspondingly, as the use of personal portable terminal devices have become popular and streaming of content in a remote server is possible, the user can use the content at various places by using various playback devices (hereinafter referred to as 'renderers').

As users travel over a wide distance, they may wish to switch renderers during playback of media or content. As shown in FIG. 1, a user watches a motion picture 102 using a mobile phone 103 while moving and switches from the mobile phone 103 to a digital television (DTV) 104 in a living room after arriving at home.

The user, who arrived at home while watching the motion picture 102 transmitted from the streaming server 101, need not watch the motion picture 102 through the mobile phone 103 since the DTV 104 which has a high image quality can be used. Accordingly the user may want to continue to watch the rest of the motion picture through the DTV 104 in the living room because the motion picture 102 output from DTV 104 has a higher image quality than that from the mobile phone 103, or because of a communication fee, or the limited battery capacity of the mobile phone 103 and the like.

The user terminates a streaming connection for the motion picture 102 that is viewed through the mobile phone 103 after arriving at home. Then the user searches for the motion picture 102 in a media server 101 through the DTV 104 in the living room which is a new renderer. The user may search for the motion picture 102 which has a format suitable for the DTV screen through the media server 101 or through another media server. The user has to do additional operations after finding the motion picture 102 to be streamed and played. That is, the user has to set up a screen ratio for playing the motion picture 102, volume information, and the like. The user has to determine the playback position of the motion picture 102 before arriving at home and request streaming playback of the motion picture 102 from the determined playback position.

In addition, an opposite operation may occur. That is, when the user has to go out because of a sudden appointment while watching a sports broadcast through the DTV 104 in the living room by a broadcast satellite service, the user may want to continue to watch the sports broadcast through the mobile phone 103. In this case, the user has to search for the motion picture 102 which has an optimized format for the mobile phone 103 through the mobile phone 103 and set up additional settings.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and a device for switching media renderers during streaming playback in existing playback environments.

According to an aspect of the present invention, there is provided a method for streaming playback of content of a server in a first client, the method including: (a) receiving playback environment information which specifies a current playback environment of a second client from the second client that is performing streaming playback of the content; and (b) performing streaming playback of the content based on the playback environment information.

In the above aspect of the present invention, the playback environment information includes at least one among playback position information, caption setting information, information for access to the content, and volume information.

According to another aspect of the present invention, there is provided a computer-readable recording medium having embodied thereon a computer program for executing the method of streaming playback.

According to another aspect of the present invention, there is provided a client device which performs streaming playback of content of a server, the device including a receiver which receives playback environment information which specifies a current playback environment of a second client from the second client that is performing streaming playback of the content; and a streaming unit which performs streaming playback of the content based on the playback environment information.

In the above aspect of the present invention, the playback environment information includes at least one among playback position information, caption setting information, information for access to the content, and volume information.

According to another aspect of the present invention, there is provided a method in which a client that is performing streaming playback of content of a server switches media renderers, the method including: (a) generating playback environment information which specifies a current playback environment of the client; and (b) transmitting the generated playback environment information to another client.

According to another aspect of the present invention, there is provided a computer-readable recording medium having embodied thereon a computer program for executing the method of switching the media renderers.

According to another aspect of the present invention, there is provided a client device which performs streaming playback of content of a server, the device including: a generator which generates playback environment information which specifies a current playback environment of the client that is performing streaming playback of the content;

and a transmitter which transmits the generated playback environment information to another client.

According to another aspect of the present invention, there is provided a method of transmitting streaming data from a server to a client, the method including: (a) receiving playback environment information for specifying a current playback environment of a first client and access information for access to a second client from the first client that is performing streaming playback of a predetermined content of the server; and (b) transmitting streaming data of the content and the playback environment information to the second client by referring to the access information.

According to another aspect of the present invention, there is provided a computer-readable recording medium having embodied thereon a computer program for executing the method of transmitting the streaming data.

According to another aspect of the present invention, there is provided a server device which transmits streaming data to a client, the device including: a receiver which receives playback environment information which specifies a current playback environment of a first client and access information for access to a second client from the first client that performs streaming playback of a predetermined content of the server; and a transmitter which transmits streaming data of the content and the playback environment information to the second client by referring to the access information.

According to another aspect of the present invention, there is provided a method in which a client that performs streaming playback of content of a server switches media renderers, the method including: (a) generating playback environment information for specifying a current playback environment of the client; (b) obtaining access information needed for access to an external client from a predetermined external client; and (c) transmitting the playback environment information and the access information to the server.

According to another aspect of the present invention, there is provided a computer-readable recording medium having embodied thereon a computer program for executing the method of switching the media renderers.

According to another aspect of the present invention, there is provided a client device which performs streaming playback of content of a server, the device including: a generator which generates playback environment information which specifies a current playback environment during playback of the content; a receiver which obtains access information for access to the external client from another client; and a transmitter which transmits the playback environment information and the access information to the server.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, exemplary embodiments according to the present invention will be described in detail with reference to the accompanying drawings.

Figure 1:
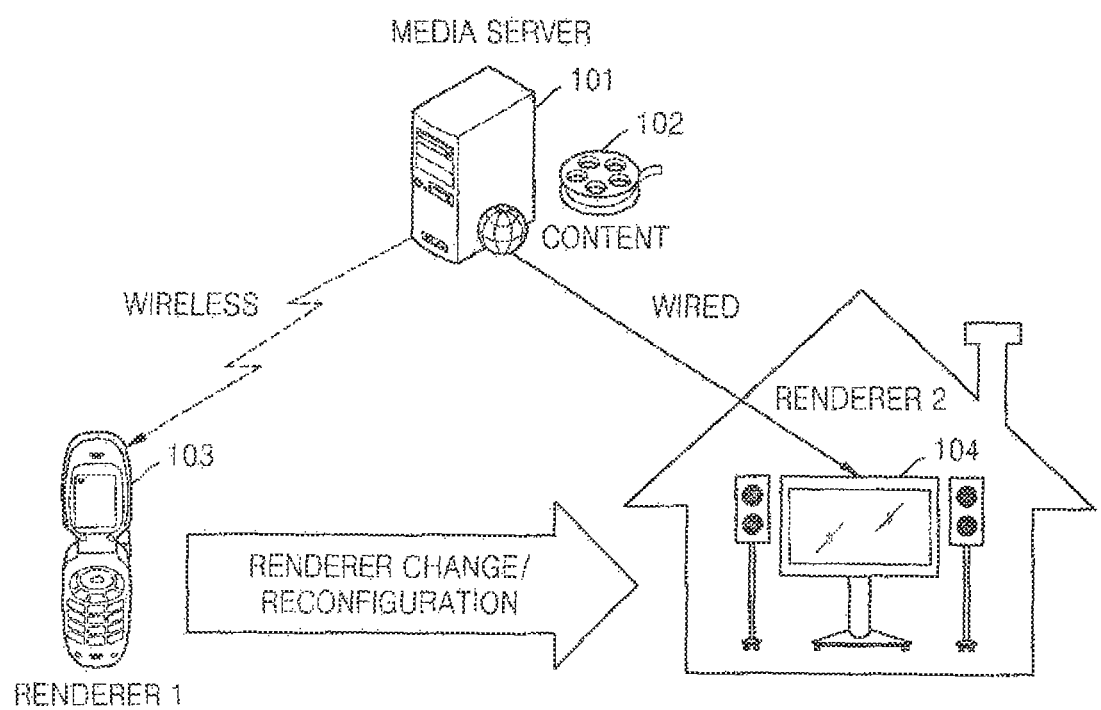
FIG. 1 illustrates a related art method of switching media renderers during streaming playback.
Figure 2:
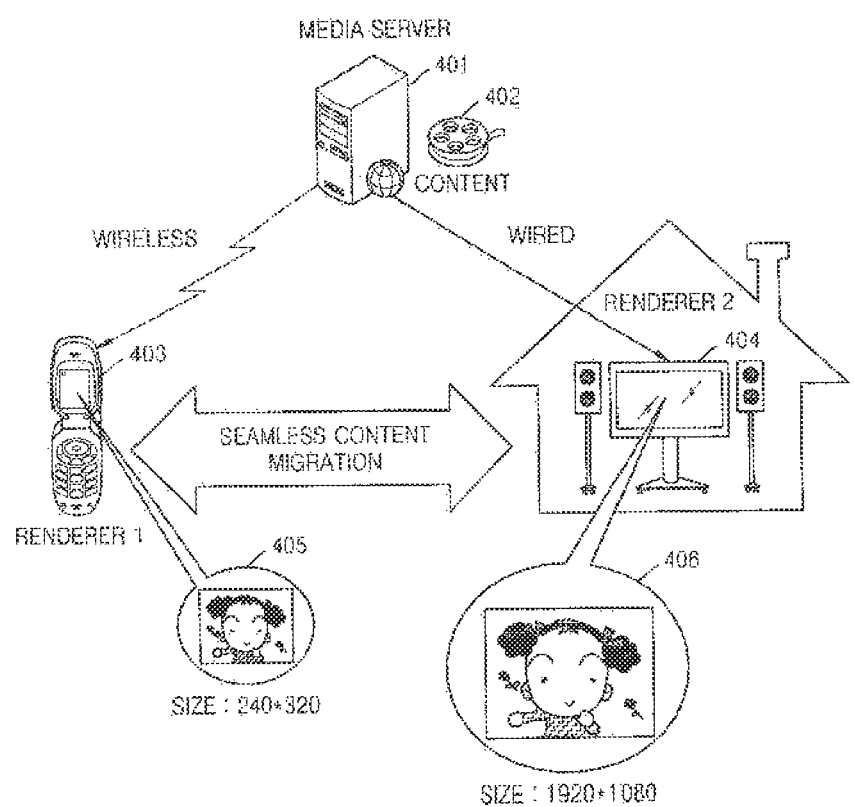
FIG. 2 illustrates a method of switching media renderers according to an exemplary embodiment of the present invention.

FIG. 2 illustrates a method of switching media renderers according to an exemplary embodiment of the present invention.

When a user arrives at home during streaming playback of content 402 of a media server 401 using a mobile phone 403, the user transmits playback environment information of the content 402 to a digital television (DTV) 404 by using a specific button of the mobile phone 403. The playback environment information may include information about a uniform resource locator (URL) of the content, volume, caption setting and the like. The DTV 404 which receives the playback environment information performs streaming playback of the content 402 of the media server 401 by using the URL of the content 402. Then, the DTV 404 plays the content 402 in the predetermined playback environment by referring to the playback environment information that is set up when the user plays the content 402 through the mobile phone 403.

In addition, when the DTV 404 requests the content 402 from the media server 401, the DTV 404 concurrently transmits information about features of the DTV 404 to the media server 401. The media server 401 searches for optimized streaming data for the features of the DTV 404 and transmits the optimized streaming data to the DTV 404 by using the information about the features of the DTV 404.

For example, even though the user watches the content 402, for example, a motion picture, in a 240×320 sized screen of the mobile phone, since the media server 401 which receives the information about features of the DTV 404 transmits the optimized streaming data for the screen size of the DTV 404 to the DTV 404, the user can watch the same motion picture in a 1920×1080 sized screen of the DTV 404 after arriving at home. Accordingly, the media server has to transmit the streaming data in a format that is changed according to the information about features of a client. Hereinafter, this will be described in detail.

Figure 3:
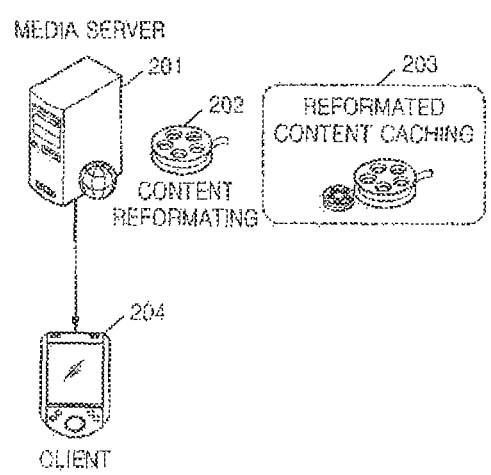
FIG. 3 illustrates a method of streaming playback of content from a server according to a device feature according to an exemplary embodiment of the present invention.

FIG. 3 illustrates a method of streaming playback of content of a server according to features of a device according to an exemplary embodiment of the present invention.

As shown in FIG. 3, when the media server 201 receives a request for the content and the information about the features of the client 204 from the client 204, the media server 201 determines an optimal format by analyzing the features of the client and then transmits the content which has the corresponding format to the client 204.

Figure 4:
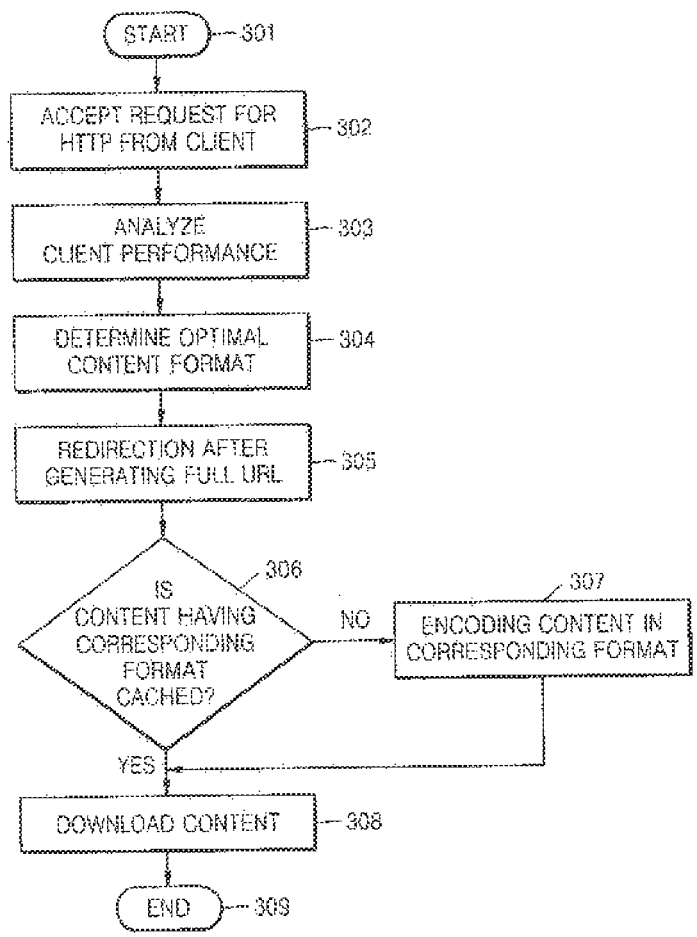
FIG. 4 is a flowchart of the method illustrated in FIG. 3 that is performed in a server according to an exemplary embodiment of the present invention.

Referring to FIG. 4, the media server accepts the request for the content from the client (operation 302). The media server then analyzes the client performance (operation 303), and determines a content format suitable for the client by referring to the information about the features of the client received together with the request for the content (operation 304). The information about the features of the client may include information about screen size, resolution, supported colors, and the like.

When the optimal content is determined, the media server generates a full URL (operation 305) and determines whether the content corresponding to the URL already exists (operation 306). If the content corresponding to the URL exists, the media server transmits the corresponding streaming data to the client (operation 308). Otherwise, the media server transforms the content into content which has a determined format (operation 307) and transmits the content which has the determined format to the client (operation 308).

Figure 5:
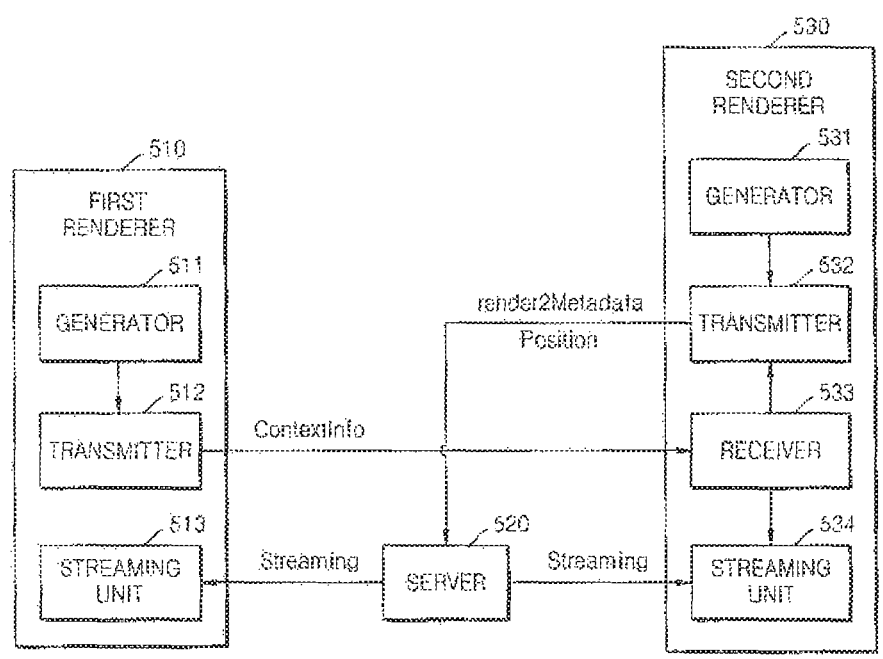
FIG. 5 is a block diagram showing media renderers and a media server according to an exemplary embodiment of the present invention.

FIG. 5 is a block diagram showing media renderers and a media server according to an exemplary embodiment of the present invention.

As shown in FIG. 5, a first renderer 510 includes a generator 511, a transmitter 512, and a streaming unit 513, and a second renderer 530 includes a generator 531, a transmitter 532, a receiver 533, and a streaming unit 534.

In the present exemplary embodiment, it is assumed that the first renderer 510 is switched to the second renderer 530 during a period when the first renderer 510 performs streaming playback of content of a server 520.

At first, in the first renderer 510, the streaming unit 513 receives the content from the server 520 and performs streaming playback of the content. The generator 511 generates playback environment information which specifies a current playback environment of the first renderer 510 that performs streaming playback. That is, the playback environment information may include information about a current playback position, volume, caption setting, a URL of the currently played content, authentication information for access to the currently played content, and the like. The transmitter 512 transmits the playback environment information generated by the generator 511 to the second renderer 530.

Next, in the second renderer 530, the generator 531 generates information about features of the second renderer 530. The information about the features of the second renderer 530 includes information about a screen size of the second renderer 530, content format that is playable in the second renderer 530, resolution supported by the second renderer 530, and the like.

The transmitter 532 transmits the information about features generated by the generator 531 and the information about the playback position included in the playback environment information to the server 520. As described in FIGS. 3 and 4, the server 520 performs streaming transmission of the content which has the optimized format for the second renderer 530 from the corresponding playback position of the first renderer 510, and the streaming unit 534 receives and plays the streaming data. Then, the streaming unit 534 plays the content based on the playback environment information of the first renderer 510, which is transmitted from the receiver 533, and thus, the playback environment of the first renderer 510 is maintained. That is, the content is played from the playback position of the first renderer 510 when the first renderer 510 requests the second renderer 530 to play the content, and the playback environment including volume, caption setting, screen ratio and the like is maintained.

Figure 6:
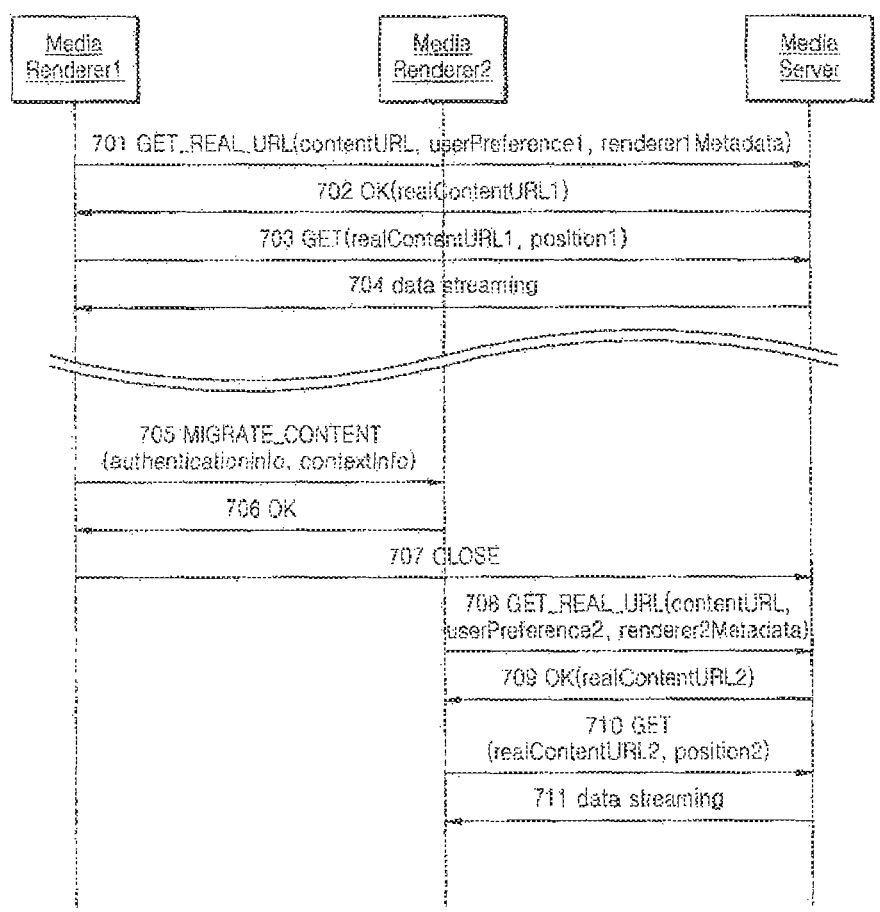
FIG. 6 shows a procedure for switching media renderers using the media renderers and the server illustrated in FIG. 5 according to another exemplary embodiment of the present invention.

FIG. 6 shows a procedure for switching media renderers using the media renderers and the server illustrated in FIG. 5 according to another exemplary embodiment of the present invention.

In order to embody a method of switching media renderers according to an exemplary embodiment of the present invention, an HTTP protocol is used. However, in the present exemplary embodiment, a request for an HTTP protocol is extended, and therefore, a message <GET_REAL_URL> for requesting an optimal content URL in consideration of the features of the renderer and a message <MIGRATE_CONTENT> for requesting another renderer to play the content instead of the renderer are newly defined.

Referring to FIG. 6, a first renderer, MediaRenderer1, requests a URL of the optimal content from the media server using the message <GET_REAL_URL> (operation 701). The message <GET_REAL_URL> includes a URL contentURL of the content, the information renderer1 Metadata about the features of the first renderer, MediaRenderer1, and a user preference value userPreference1.

The user preference is information that the user can set when streaming playback of the content is performed by using the first renderer, MediaRenderer1, and includes various information such as screen ratio, motion picture compression method, and the like. The user may search for the optimized content for the first renderer MediaRenderer1 by reflecting the user preference.

The media server determines the optimal content by using the aforementioned information and returns the URL value for the determined optimal content to the first renderer, MediaRenderer1 (operation 702).

The first renderer, MediaRenderer1, requests the content to be streamed using the URL (real URL) for the optimal content (operation 703), and the media server that receives the request starts streaming the corresponding content (operation 704). The real URL corresponds to the URL used for initially requesting the content and denotes a real URL where the optimal content exists.

The first renderer, MediaRenderer1, requests a second renderer, MediaRenderer2, to play the content which the first renderer MediaRenderer1 is playing, by using the message <MIGRATE_CONTENT>, while playing the content (operation 705). The message <MIGRATE_CONTENT> includes playback environment information contextInfo and authentication information authenticationInfo for access to the corresponding streaming.

In the present exemplary embodiment, it is assumed that the playback environment information includes the URL of the content. However, the URL may be included in the message <MIGRATE_CONTENT> instead of in the playback environment information. When the second renderer, MediaRenderer2, accepts the content playback request (operation 706), the first renderer, MediaRenderer1, disconnects the existing connection for streaming (operation 707). When the user switches the playback devices, it is desirable that operation 707 of terminating the streaming of the content is performed as late as possible, in order to reduce a time period in which streaming of the content has stopped. Operation 707 may be performed after the second renderer MediaRenderer2 starts streaming the content.

The second renderer, MediaRenderer2, extracts the URL of the content from the playback environment information received through the message <MIGRATE_CONTENT> and requests the content from the media server by using the message <GET_REAL_URL> including the URL of the content contentURL, the information renderer2Metadata about the features of the second renderer, MediaRenderer2, and the user preference userPreference2 (operation 708). The media server analyzes the information about the features of the second renderer, MediaRenderer2, included in the message <GET_REAL_URL>, searches for the optimal format among various formats for the second renderer MediaRenderer2, and returns the URL of the found streaming data to the second renderer MediaRenderer2 (operation 709).

The optimal second renderer, MediaRenderer2, requests the content to be streamed from the media server by using the URL (real URL) for the optimal content received from the media server (operation 710). Then, the second renderer, MediaRenderer2, transmits the playback position information position2 included in the playback environment information received from the first renderer, MediaRenderer1, to the media server. The media server sets the corresponding position as a starting position of streaming data by referring to the playback position information and transmits the playback position information to the second renderer MediaRenderer2 (operation 711).

In the present exemplary embodiment, even though it is assumed that the second renderer, MediaRenderer2, obtains the real URL and requests the content to be streamed, the content having the optimal format for the second renderer, MediaRenderer2, is found in the media server, and not the URL of the content but the content itself is immediately transmitted to the second renderer, MediaRenderer2.

Figure 7:
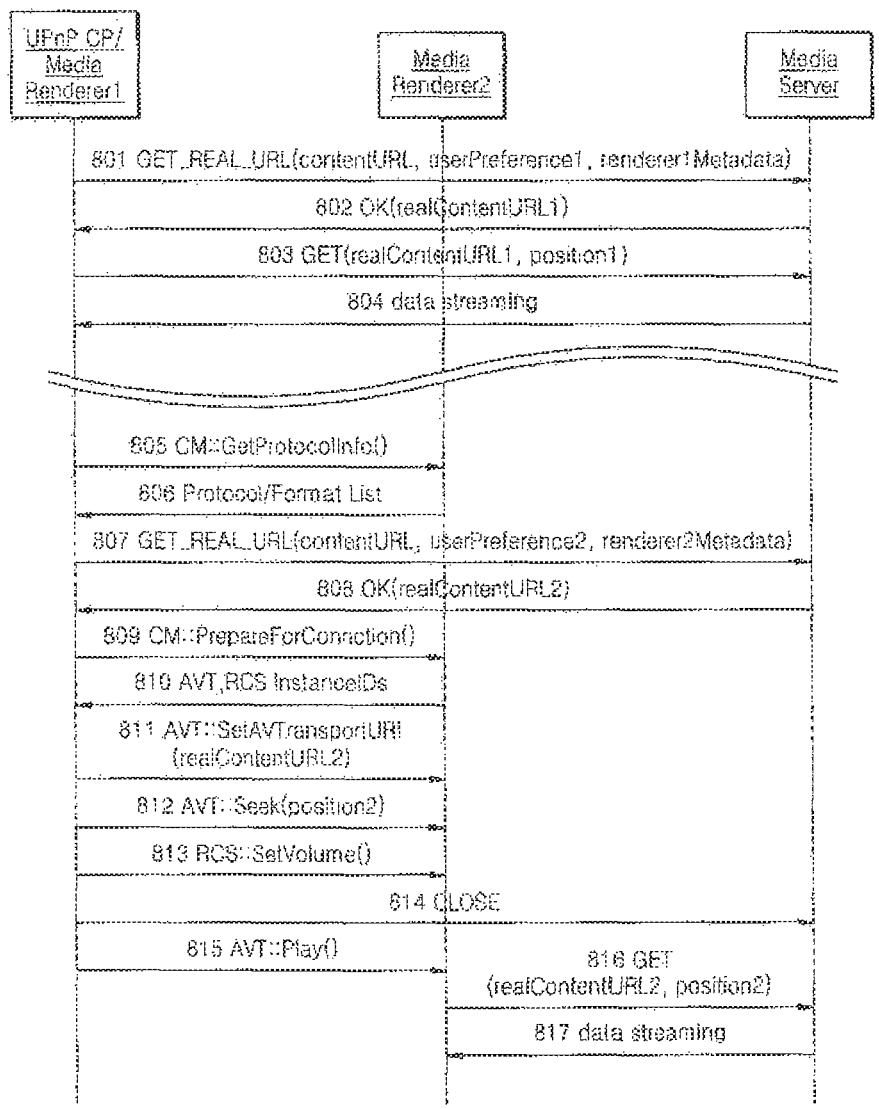
FIG. 7 shows a procedure for switching media renderers using the media renderers and the server illustrated in FIG. 5 according to another exemplary embodiment of the present invention.

FIG. 7 shows a procedure for switching media renderers using the media renderers and the server illustrated in FIG. 5 according to another exemplary embodiment of the present invention.

Figure 8:
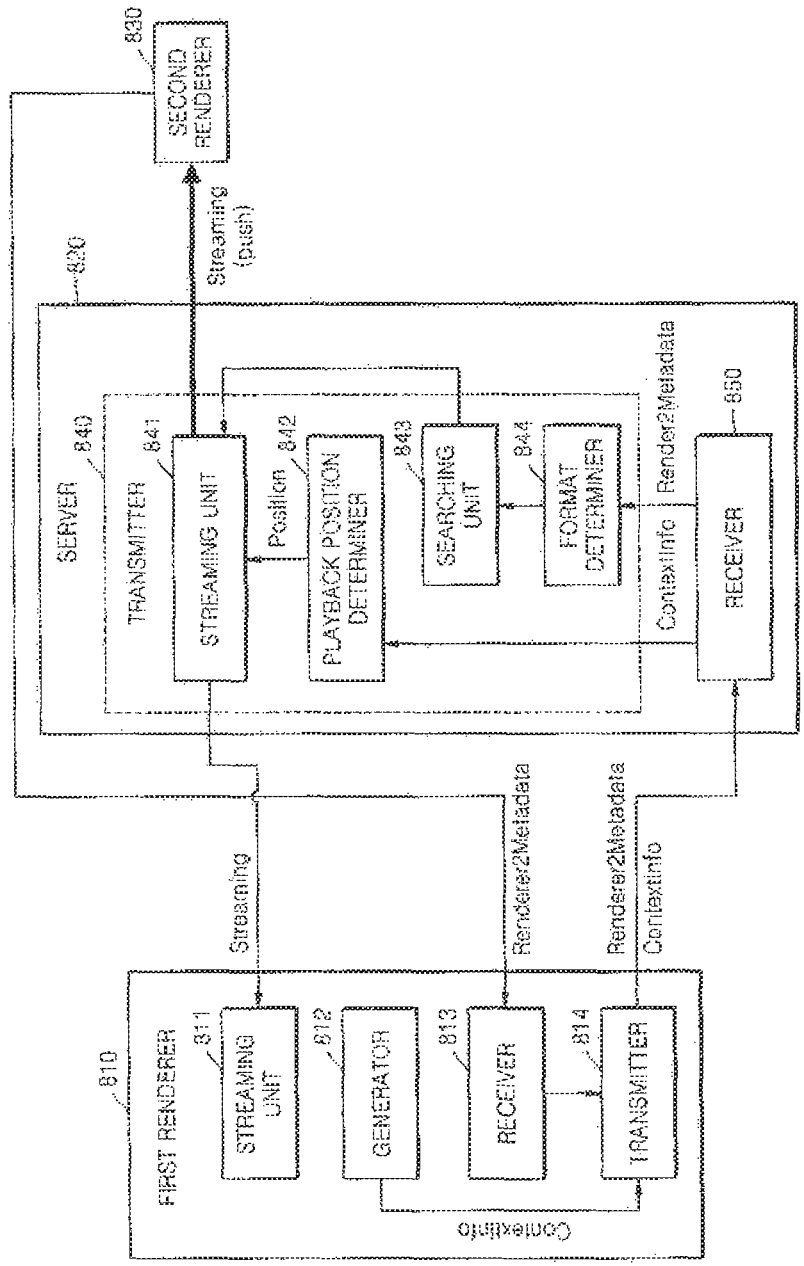
FIG. 8 is a block diagram showing media renderers and a media server according to another exemplary embodiment of the present invention.

In FIG. 7, a method of switching media renderers according to an exemplary embodiment of the present invention is embodied using only an HTTP protocol. In FIG. 8 however, signal flows will be described when the first renderer, MediaRenderer1, communicates with the second renderer, MediaRenderer2, using universal plug and play (UPnP) action in home networks. In the present exemplary embodiment, the first renderer, MediaRenderer1, operates as a UPnP control point (CP).

Since operations 801 to 804, in which the first renderer, MediaRenderer1, performs initial streaming of the content are the same as operations 701 to 704 in FIG. 7, a detailed description of operations 801 to 804 will be omitted.

The first renderer, MediaRenderer1, transmits a message <CM::GetProtocolInfo( )> to the second renderer, MediaRenderer2, in order to switch renderers while the first renderer, MediaRenderer1, performs streaming playback of the content (operation 805). The message is a message for requesting the second renderer, MediaRenderer2, to transmit protocol feature and format information of the playable content data with respect to the second renderer, MediaRenderer2. The second renderer, MediaRenderer2, transmits its own protocol information and a data format list of playable data formats to the first renderer, MediaRenderer1, in response to the message <CM::GetProtocolInfo( )> (operation 806).

The first renderer, MediaRenderer1, generates the information renderer2Metadata about the features of the second renderer, MediaRenderer2, based on the information obtained in operation 806 and requests the URL for the optimal content from the media server by using the message <GET_REAL_URL> which includes the information about features of the device, the URL contentURL of the content, and the user preference userPreference2 of the second renderer, MediaRenderer2 (operation 807).

The media server searches for the content which has the optimal format by analyzing the message <GET_REAL_URL> of the first renderer, MediaRenderer1, and returns the URL value for the corresponding streaming data to the first renderer, MediaRenderer1 (operation 808). Even though it is not shown, when the optimized format for the second renderer, MediaRenderer2, does not exist, the media server may generate the content which has the optimized format for the second renderer, MediaRenderer2, by encoding the content by using a prestored format in the media server. In addition, the content which has the optimized format for the second renderer, MediaRenderer2, may be stored in the media server or another external server. Even in this case, the media server merely returns the URL of the corresponding streaming data to the second renderer, MediaRenderer2.

The first renderer, MediaRenderer1, transmits a message <CM::PrepareForConnection( )> to the second renderer, MediaRenderer2, for communication with the second renderer, MediaRenderer2 (operation 809). The second renderer, MediaRenderer2, which receives the message <CM::PrepareForConnection( )> generates an instance (operation 810).

The first renderer, MediaRenderer1, transmits address information of the optimal content received from the media server using a message <AVT::SetAVTransportURI( )> to the second renderer, MediaRenderer2. Then, the first renderer, MediaRenderer1, transmits the playback position information and the volume information of the content to the second renderer, MediaRenderer2, using messages <AVT::Seek( )> and <RCS::SetVolume( )>, respectively (operation 813).

The first renderer, MediaRenderer1, which completely transmits all the information needed by the second renderer, MediaRenderer2, disconnects the existing connection for streaming and requests the second renderer, MediaRenderer2, to play the corresponding content (operation 815).

The second renderer, MediaRenderer2, requests the media server to perform streaming of the content by using the URL (real URL) for the optimal content received from the first renderer, MediaRenderer1, (operation 816). At this time, starting position information position2 of the streaming is also transmitted. The media server that receives the streaming request transmits the streaming data of the corresponding content from the specified position according to the starting position information postion2 (operation 817).

FIG. 8 is a block diagram showing media renderers and a media server according to another exemplary embodiment of the present invention.

In the present exemplary embodiment, the first renderer 810 that performs streaming playback of the content transmits information needed for switching playback devices to the server 820. The server 820 performs streaming transmission of the corresponding content to the second renderer 830, in a push manner, by referring to the information received from the first renderer 810.

As shown in FIG. 8, the first renderer 810 includes a streaming unit 811, a generator 812, a receiver 813, and a transmitter 814. The server 820 includes a transmitter 840 and a receiver 850. The transmitter 840 includes a streaming unit 841, a playback position determiner 842, a searching unit 843, and a format determiner 844.

At first, in the first renderer 810 according to an exemplary embodiment of the present invention, the streaming unit 811 performs streaming playback of content transmitted from the server 820. The generator 812 generates the playback environment information about the current playback environment in which the content is played and transmits the playback environment information to the transmitter 814. The receiver 813 receives access information, needed for access to the second renderer 830, and the information about the features of the second renderer 830 from the second renderer 830 and transmits the access information and the information about the features of the second renderer 830 to the transmitter 814. Here, the access information may be an IP address or a MAC address of the second renderer 830. In the case where the second renderer 830 is included in a home network, the access information may be authentication information needed for access to the second renderer 830 from outside of the home network.

The transmitter 814 transmits the information received from the generator 812 and the receiver 813 to the server 820 and requests the server 820 to transmit the content to the second renderer 830 in a push manner.

Next, the server 820 according to an exemplary embodiment will be described. The receiver 850 receives the access information, the playback environment information, and the information about features of the second renderer 830 from the first renderer 810 and transmits the received information to the transmitter 840.

The playback position determiner 842 determines the playback position of the content by referring to the playback environment information received from the first renderer 810. The format determiner 844 determines the optimized format of the content for the second renderer 830 by referring to the information about the features of the second renderer 830. The searching unit 843 searches a storage device (not shown) in the server or servers (not shown) on external networks and obtains the URL of the content which has the format determined by the format determiner 844.

The streaming unit 841 performs streaming transmission of the content found by the searching unit 843 from the playback position determined by the playback position determiner 842 to the second renderer 830. Then, the streaming data of the content is transmitted in a push manner. In addition, the transmitter 840 transmits the playback environment information of the first renderer 810 to the second renderer 830 and thus enables the second renderer 830 to play the content in the same playback environment as the first renderer 810 by referring to the playback environment information.

Figure 9:
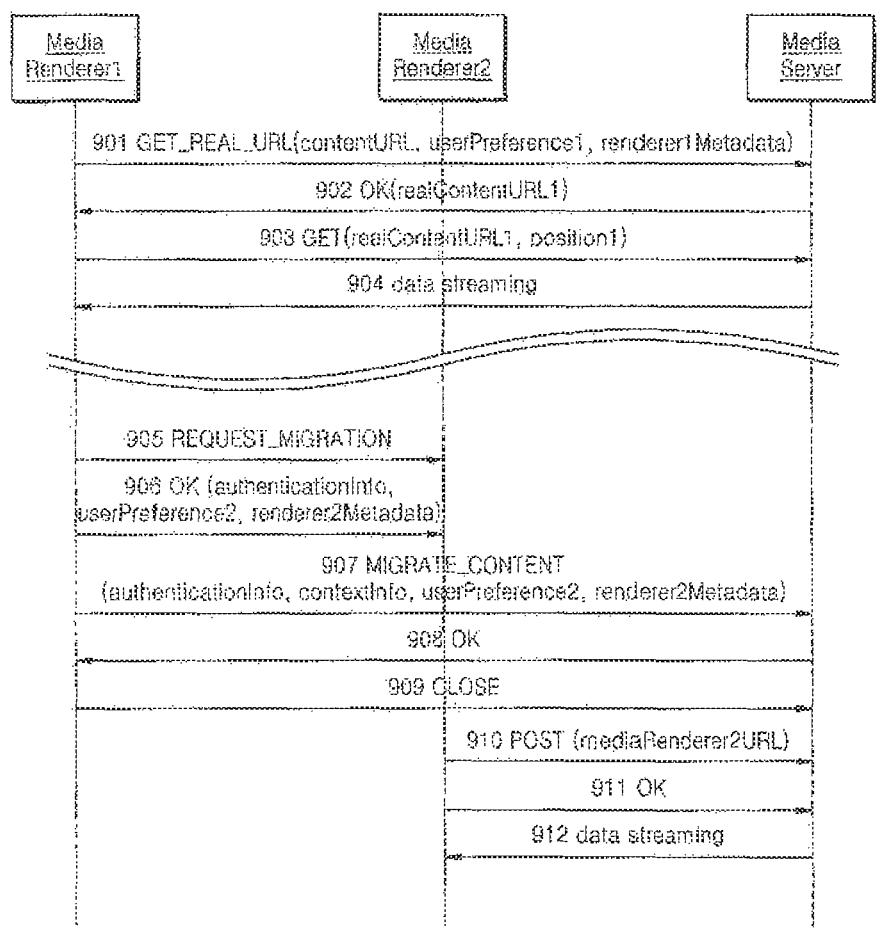
FIG. 9 shows a procedure for switching media renderers using the media renderers and the server illustrated in FIG. 8 according to another exemplary embodiment of the present invention.

FIG. 9 shows a procedure for switching media renderers using the media renderers and the server illustrated in FIG. 8 according to another exemplary embodiment of the present invention. A method of switching media renderers according to the exemplary embodiment of the present invention is embodied using an HTTP protocol.

The initial streaming procedures of the content performed by the first renderer MediaRenderer1 (operations 901 to 904) are the same as the operations 701 to 704 of FIG. 6 and therefore a description of operations 901 to 904 will be omitted. The first renderer, MediaRenderer1, transmits a message <REQUEST_MIGRATION> to the second renderer, MediaRenderer2 (operation 905). The message <REQUEST_MIGRATION> is a HTTP message for requesting access information from the second renderer, MediaRenderer2, such as authentication information needed for a push operation from the first renderer, MediaRenderer1, to the second renderer, MediaRenderer2, user preference, and the information about the features of the second renderer, MediaRenderer2. Unlike the authentication information in FIG. 6, the authentication information in the present embodiment is needed for access to the second renderer, MediaRenderer2, from the media server.

The second renderer, MediaRenderer2, that receives the message <REQUEST_MIGRATION> transmits the requested information to the first renderer, MediaRenderer1 (operation 906). The first renderer, MediaRenderer1, transmits the information requested in operation 906 and its own playback environment information to the media server and requests the media server to push the content, which the first renderer, MediaRenderer1, plays, to the second renderer, MediaRenderer2 (operation 907). When the second renderer, MediaRenderer2, accepts the request (operation 908), the first renderer, MediaRenderer1, terminates the streaming connection with the server (operation 909).

The media server enables the second renderer, MediaRenderer2, to open a specific port through a message <POST> (operations 910 and 911) and performs streaming transmission of the optimized content for the second renderer, MediaRenderer2, through the corresponding port (operation 912). That is, in the present exemplary embodiment, the second renderer, MediaRenderer2, does not request the content from the media server, but the media server transmits the content to the second renderer, MediaRenderer2, in a push manner. Then the media server performs streaming from the playback position when the first renderer, MediaRenderer1, generates the playback environment information and transmits the playback environment information of the first renderer, MediaRenderer1, to the second renderer, MediaRenderer2, so that the second renderer, MediaRenderer2, can maintain the playback environment such as volume setting, caption setting, and the like, the same as that of the first renderer, MediaRenderer1.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

According to an exemplary embodiment of the present invention, when the user wants to continue to watch streaming media content through a new media renderer, the user can continue to watch the media content through the new media renderer in an existing playback environment setting without additional manipulation and can switch media renderers without having to stop watching the media content.

In addition, the user can watch the optimized media content for the new media renderer without additional manipulation.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for performing playback of digital media content data provided by a server, the method comprising:
   generating, by a wireless device client, playback position information which specifies a playback position in the digital media content data, the wireless device client being currently performing playback of the digital media content data at the playback position as a playback handoff position;
   obtaining, by the wireless device client, access information directly from a display device client, the access information being needed for access by the server to the display device client; and
   transmitting, by the wireless device client, the playback position information and the access information to the server along with a request for transmission of the digital media content data from the server to the display device client so that the display device client starts playback of the digital media content data currently being played by the wireless device client from the playback handoff position without requiring additional input from a user of the display device client to find the playback handoff position,
   wherein the method further comprises:
      obtaining, by the wireless device client, information about features of the display device client directly from the display device client; and
      transmitting, by the wireless device client, the obtained information about the features of the display device client to the server such that the server transmits the digital media content data to the display device client in an optimal format based on the obtained information.

2. The method of claim 1, wherein the generating further comprises generating volume setting information of the digital media content, and
   wherein the transmitting the playback position information and the access information further comprises transmitting the volume setting information.

3. The method of claim 1, wherein the further comprises generating caption setting information of the digital media content, and
   wherein the transmitting the playback position information and the access information further comprises transmitting the caption setting information.

4. The method of claim 1, wherein the display device client is in a home network, the access information includes authentication information needed for accessing the display device client from outside of the home network.

5. A wireless device client which performs playback of digital media content data provided by a server, the wireless device client comprising:
   a generator which generates playback position information which specifies a playback position in the digital media content data, the wireless device client being currently performing playback of the digital media content data at the playback position as a playback handoff position;
   a receiver which obtains access information directly from a display device client, the access information being needed for access by the server to the display device client; and
   a transmitter which transmits the playback position information and the access information to the server along with a request for transmission of the digital media content data from the server to the display device client so that the display device client starts playback of the digital media content data currently being played by the wireless device client from the playback handoff position without requiring additional input from a user of the display device client to find the playback handoff position,
   wherein the receiver obtains information about features of the display device client directly from the display device client, and the transmitter transmits the obtained information about the features of the display device client to the server such that the server transmits the digital media content data to the display device client in an optimal format based on the obtained information.

6. The wireless device client of claim 5, wherein the generator further generates volume setting information of the digital media content, and
   wherein the transmitter further transmits the volume setting information.

7. The wireless device client of claim 5, wherein the generator further generates caption setting information of the digital media content, and
   wherein the transmitter further transmits the caption setting information.

8. The wireless device client of claim 5, wherein the information about the features of the display device client includes at least one of screen size information, information about playable content formats, and information about a supported resolution.

9. The wireless device client of claim 5, wherein the display device client is in a home network, the access information includes authentication information needed for accessing the display device client from outside of the home network.

10. A method for providing digital media content data from a server to a display device client, the method comprising:
    receiving, by the server, playback position information from a wireless device client along with a request for transmission of the digital media content data from the server to the display device client, the playback position information specifying a playback position in the digital media content data, the wireless device client being currently performing playback of the digital media content data at the playback position as a playback handoff position;
    receiving, by the server, access information directly from the wireless device client, the access information being needed for access by the server to the display device client; and
    transmitting, by the server, the digital media content data to the display device client using the access information such that the display device client starts playback of the digital media content data currently being played by the wireless device client from the playback handoff position without requiring additional input from a user of the display device client to find the playback handoff position,
    wherein the method further comprises receiving, by the server, information about features of the display device client from the wireless device client, wherein the transmitting comprises:
       determining an optimal format of the digital media content data for the display device client by referring to the received information about the features of the display device client; and
       transmitting the digital media content data in the optimal format to the display device client.

11. The method of claim 10, further comprising:
receiving volume setting information of the digital media content, and
transmitting the volume setting information.

12. The method of claim 10, further comprising:
receiving caption setting information of the digital media content, and
transmitting the caption setting information.

13. The method of claim 10, wherein the information about the features of the display device client includes at least one of screen size information, information about playable content formats, and information about a supported resolution.

14. The method of claim 10, wherein the display device client is in a home network, the access information includes authentication information needed for accessing the display device client from outside of the home network.

15. A server which provides digital media content data to a display device client, the server comprising:
a receiver which receives playback position information and access information directly from a wireless device client along with a request for transmission of the digital media content data from the server to the display device client, the playback position information specifying a playback position in the digital media content data, the wireless device client being currently performing playback of the digital media content data at the playback position as a playback handoff position, the access information being needed for access by the server to the display device client; and
a transmitter which transmits the digital media content data to the display device client using the access information such that the display device client starts playback of the digital media content data currently being played by the wireless device client from the playback handoff position without requiring additional input from a user of the display device client to find the playback handoff position,
wherein the receiver receives information about features of the display device client from the wireless device client, and wherein the transmitter comprises:
a format determiner which determines an optimal format of the digital media content data for the display device client by referring to the received information about the features of the display device client; and
a streaming unit which performs streaming transmission of the digital media content data in the optimal format to the display device client.

16. The server of claim 15, wherein the receiver further receives volume setting information of the digital media content, and
wherein the transmitter further transmits the volume setting information.

17. The server of claim 15, wherein the receiver further receives caption setting information of the digital media content, and
wherein the transmitter further transmits the caption setting information.

18. The server of claim 15, wherein the information about the features of the display device client includes at least one of screen size information, information about playable content formats, and information about a supported resolution.

19. The server of claim 15, wherein the display device client is in a home network, the access information includes authentication information needed for accessing the display device client from outside of the home network.

20. A non-transitory computer-readable medium having embodied thereon a computer program for causing a computer to execute a process of performing playback of digital media content data provided by a server, the process comprising:
generating, by a wireless device client, playback position information which specifies a playback position in the digital media content data, the wireless device client being currently performing playback of the digital media content data at the playback position as a playback handoff position;
obtaining, by the wireless device client, access information directly from a display device client, the access information being needed for access by the server to the display device client; and
transmitting, by the wireless device client, the playback position information and the access information to the server along with a request for transmission of the digital media content data from the server to the display device client so that the display device client starts playback of the digital media content data currently being played by the wireless device client from the playback handoff position without requiring additional input from a user of the display device client to find the playback handoff position,
wherein the process further comprises:
obtaining, by the wireless device client, information about features of the display device client directly from the display device client; and
transmitting, by the wireless device client, the obtained information about the features of the display device client to the server such that the server transmits the digital media content data to the display device client in an optimal format based on the obtained information.

21. A non-transitory computer-readable medium having embodied thereon a computer program for causing a computer to execute a process of providing digital media content data from a server to a display device client, the process comprising:
receiving, by the server, playback position information from a wireless device client along with a request for transmission of the digital media content data from the server to the display device client, the playback position information specifying a playback position in the digital media content data, the wireless device client being currently performing playback of the digital media content data at the playback position as a playback handoff position;
receiving, by the server, access information directly from the wireless device client, the access information being needed for access by the server to the display device client; and
transmitting, by the server, the digital media content data to the display device client using the access information such that the display device client starts playback of the digital media content data currently pending played by the wireless device client from the playback handoff position without requiring additional input from a user of the display device client to find the playback handoff position,
wherein the process further comprises receiving, by the server, information about features of the display device client directly from the wireless device client, wherein the transmitting comprises:

determining an optimal format of the digital media content data for the display device client by referring to the received information about the features of the display device client; and transmitting the digital media content data in the optimal format to the display device client.

* * * * *